(No Model.)

F. P. STIKER.
SACCHARIFICATION OF STARCH.

No. 270,260. Patented Jan. 9, 1883.

Witnesses.
J. M. Caldwell.
Charles B. Cook.

Inventor.
Flavius P. Stiker.
By James Sangster
Atty.

UNITED STATES PATENT OFFICE.

FLAVIUS P. STIKER, OF TORONTO, ONTARIO, CANADA.

SACCHARIFICATION OF STARCH.

SPECIFICATION forming part of Letters Patent No. 270,260, dated January 9, 1883.

Application filed August 26, 1882. (No model.)

*To all whom it may concern:*

Be it known that I, FLAVIUS P. STIKER, a citizen of the United States, residing in Toronto, in the Province of Ontario and Dominion of Canada, have invented certain new and useful Improvements in the Saccharification of Starch, of which the following is a specification.

It is now well known that the saccharification of starch by means of dilute acids is quickened under the influence of pressure, and consequently higher temperature, several devices, usually called "closed converters," having been invented for that purpose, all of which have one common defect, which is, that in converters a little large, that part of the acidulated starch-liquor which comes in contact with the heated parts of the apparatus becomes saccharified and caramelized before other portions are saccharified. In the open converters without high pressure the experience of the grape-sugar manufacturer consists in the rule that the starch with water is allowed to flow in a small stream in boiling water containing dilute sulphuric acid until by applying the proper test it is found that the saccharification is completed to the desired point. This point is not usually reached until some time after the flow of the entering starch-liquor has been stopped. It will be seen that the older process is still more defective, in fact the conversion under pressure having been invented as an improvement, and it has proved, as expected, a great step in advance.

My invention consists in making the process continuous by means which will be more clearly hereinafter shown by reference to the drawings, in which—

Figure 1:
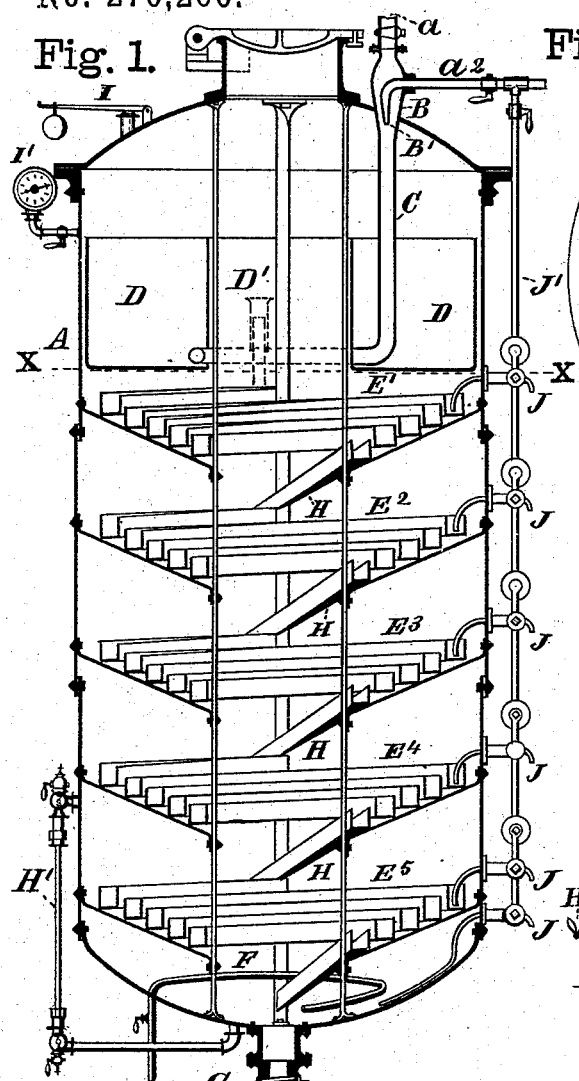
Figure 2:
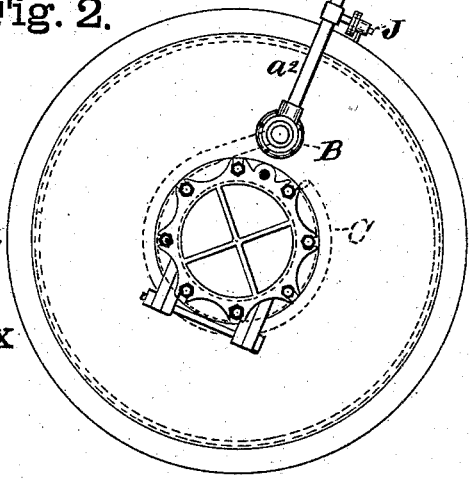
Figure 3:
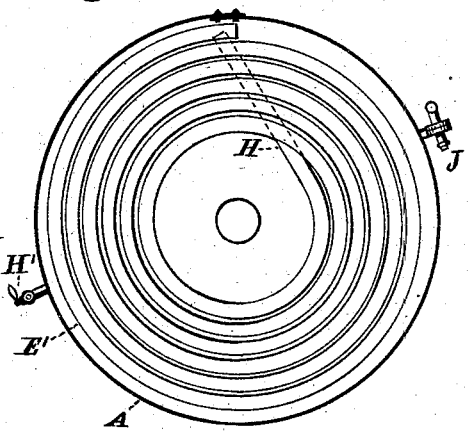
Figure 4:
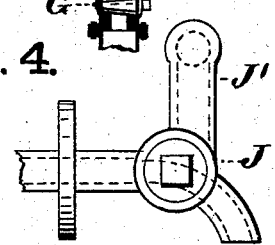
Figure 5:
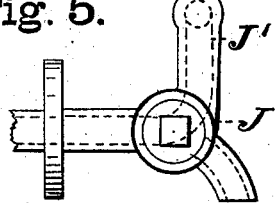

Figure 1 is a vertical central section through the apparatus. Fig. 2 is a plan or top view. Fig. 3 represents a horizontal section through line $x$ $x$ of Fig. 1, and Figs. 4 and 5 are enlarged side elevations of the test-cocks J.

A represents the body of the apparatus.

I admit the acidulated starch-liquor through the opening $a$ of the siphon B, where a steam-jet B' takes it and forces it through pipe C into the annular vessel D. The chemical transformation begins at once in the steam-siphon B, and is continued in pipe C and in the annular vessel D, where it is liquefied, or partly so, to prevent clogging in the balance of the apparatus; but the starch, dilute acid, and steam may be introduced separately, if desired. From the annular vessel D the acidulated liquefied or partly-liquefied starch passes through the overflow or other suitable opening D' into a suitable number of helical troughs or gutters, E', $E^2$, $E^3$, $E^4$, and $E^5$, the number, style, and disposition of which may be considerably varied. For instance, a pipe may be used in their place, which may be perforated on its upper portion, if desired, and the form of the coil or its equivalent may be varied, so long as the starch-liquor is kept exposed for a sufficient length of time in thin sheets or bodies to the action of dilute acids, heat, and, when required, of pressure, (as the process may be carried on without pressure, although I do not think with as good results,) to effect the conversion or saccharification to the point desired, as, according to the time of action, temperature, pressure, and quantity of acid used, dextrine, glucose, or grape-sugar may be made, or a mixture of them. After having passed over the last helical gutter or tube the product flows out into the bottom of the apparatus, where it can still be subjected to further action, if desired, by the steam-coil F, after which it may be discharged through any suitable valve or stop cock, G. It will be noticed that as the starch-liquor passes down through the first helical trough it moves from the circumference toward the center and then down through a suitable conductor, H, to the outer part of the next helical trough, and so on through the series; but this arrangement may be revised or changed, if desired, without altering the nature of my invention.

A glass or other gage, H', may be placed on the apparatus to indicate the depth of the liquor in the bottom of the same. It should also be provided with suitable safety-valves, I, and pressure-gage I'.

J represents the test-cocks, which are connected to the steam-pipe J'. Their construction is such that they can be used either for drawing off samples, or, when not in use for that purpose, they can be turned, so that a steam-jet will be forced in the reverse manner to clean and keep it clear or from clogging. Their construction is clearly shown in Figs. 4 and 5, in which the dotted lines in Fig. 4 represent it turned in position for drawing off test samples, and Fig. 5 in position for admitting a jet of steam into the apparatus for the purposes above described.

Instead of the gutters or helical troughs, the pipes C may be continued and arranged in a coil, spiral or otherwise, in any well-known way, so as to get the required length, and, if used under pressure, the upper portion may be perforated.

I claim as my invention—

1. The herein-described process for the saccharification of starch, which consists in passing the starch-liquor through a closed converter in a trough or pipe, or any suitable passage of sufficient length to insure the saccharification of the starch during said passage, substantially as described.

2. A closed converter having a continuous passage-way through it of the required length to prolong the passage of the starch-liquor and expose it to the heat for a sufficient length of time to insure its saccharification during such passage.

3. A continuous converter, in which the starch-liquor or acidulated starch and steam are in actual contact during the passage of said starch-liquor through troughs or pipes within it of sufficient length, as described, to insure the required length of time for the saccharification of the starch during its passage under such conditions, substantially as specified.

4. The combination of the converter A, siphon B, pipe C, steam-pipe J', and its test-cocks J, and connecting pipes with a vessel, D, overflow-pipe D', and helical conducting troughs or pipes $E'$ $E^2$ $E^3$ $E^4$ $E^5$, substantially as and for the purposes described.

FLAVIUS P. STIKER.

Witnesses:
JAMES SANGSTER,
J. M. CALDWELL.